J. K. JAMES.
BASIN-COCK.
No. 192,120. Patented June 19, 1877.
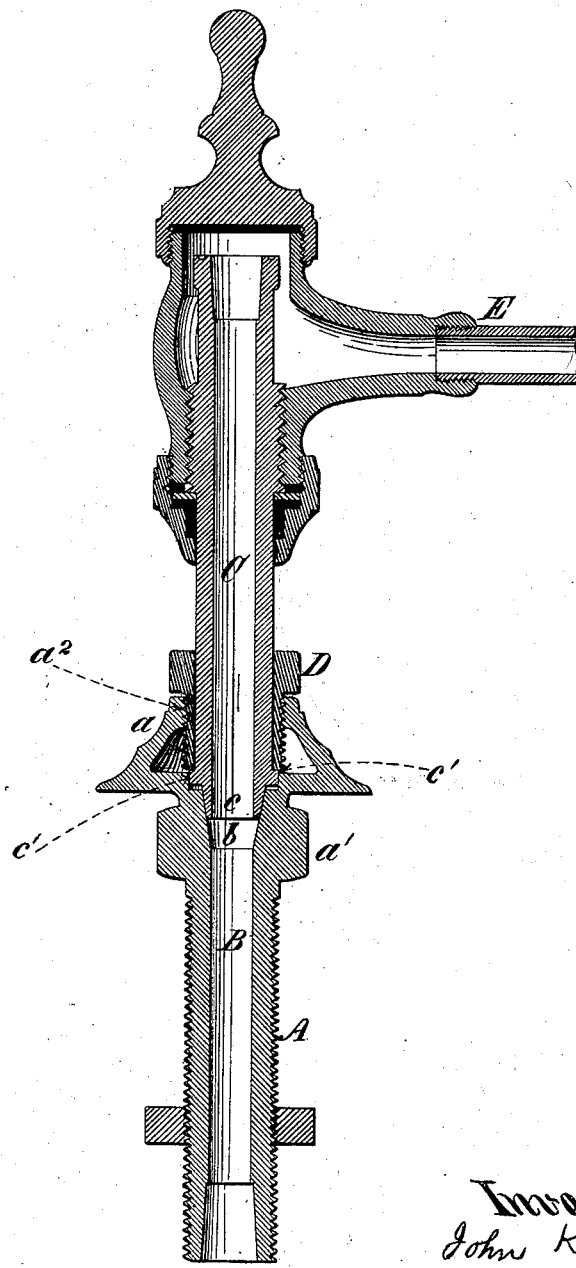

UNITED STATES PATENT OFFICE.

JOHN K. JAMES, OF CAMBRIDGE, MASSACHUSETTS, ASSIGNOR TO CHARLES HARRISON, OF NEW YORK, N. Y.

IMPROVEMENT IN BASIN-COCKS.

Specification forming part of Letters Patent No. 192,120, dated June 19, 1877; application filed May 21, 1877.

*To all whom it may concern:*

Be it known that I, JOHN K. JAMES, of Cambridge, Massachusetts, have invented a certain Improvement in Basin-Cocks, of which the following is a specification:

My improvement relates to what are known as "swing" compression-cocks; and my invention consists in connecting the valve-neck with its base by means of a friction-nut, for the purpose of permitting the adjustment of the head with reference to the range of its swinging motion, without moving the base to which it is connected.

The accompanying drawing is a central longitudinal section of a compression-cock attached to its base by means of my improvement.

Referring to the drawing, what I have spoken of as the base of the cock is the hollow bolt A, provided with the head $a$, which is intened to rest upon the top of the slab through which the bolt is inserted. Beneath the head the bolt is provided with a square collar, $a^1$. In this class of structures it is customary to cut a square hole in the slab on which the cock is placed to fit this square collar $a^1$, for the purpose of preventing the bolt from turning when the cock is turned. The exterior of the shank of the hollow bolt is provided with a screw-thread and the usual nut for the purpose of engaging the under side of the slab and holding the head $a$ firmly in place. Near the head, the passage B, within the bolt A, is reamed out to form the hollow conical seat $b$ for the tapered end $c$ of the hollow neck C. The opening in the head $a$ of the hollow bolt is enlarged in diameter, and is provided with a female screw-thread, $a^2$, for engaging a male thread on the hollow friction-nut D. The lower end of the hollow nut D bears upon the annular shoulder $c'$ on the neck.

It will thus be seen that when the tapered end $c$ of the neck is dropped into its conical seat $b$, and the hollow nut D is secured into the head $a$ of the bolt, the pressure of the lower end of the hollow nut D upon the annular shoulder forces the tapered end of the neck tightly into its seat, and that if at any time it is desired to change the adjustment of the cock with reference to the part of the horizontal plane in which its nozzle E has its range of motion, it will only be necessary to loosen the nut D, and turn the neck upon its longitudinal axis into the position which may be desired, and then screw home the nut D, which will firmly secure the parts in the position in which they have been adjusted.

I claim as my invention—

In a swing compression-cock, the hollow neck C, provided with the tapered lower end $c$, and the annular shoulder $c'$, in combination with the hollow nut D, and the hollow bolt A, provided with the hollow conical seat $b$, as and for the purposes set forth.

JOHN K. JAMES.

Witnesses:
BENJA. BRINTNALL,
CHAS. D. POORE.